(12) United States Patent
Matsushita

(10) Patent No.: US 8,600,465 B2
(45) Date of Patent: Dec. 3, 2013

(54) SUPERCONDUCTOR CABLE AND AC POWER TRANSMISSION CABLE

(75) Inventor: Teruo Matsushita, Kitakyushu (JP)

(73) Assignee: Kyushu Institute of Technology, Fukuoka (JP)

(*) Notice: Subject to any disclaimer, the term of this patent is extended or adjusted under 35 U.S.C. 154(b) by 57 days.

(21) Appl. No.: 13/500,005

(22) PCT Filed: Oct. 6, 2010

(86) PCT No.: PCT/JP2010/067549
§ 371 (c)(1),
(2), (4) Date: Apr. 3, 2012

(87) PCT Pub. No.: WO2011/043376
PCT Pub. Date: Apr. 14, 2011

(65) Prior Publication Data
US 2012/0214676 A1  Aug. 23, 2012

(30) Foreign Application Priority Data
Oct. 7, 2009  (JP) ................................. 2009-233415

(51) Int. Cl.
*H01L 39/24* (2006.01)
*H01L 39/14* (2006.01)

(52) U.S. Cl.
USPC ........................................ 505/230; 505/231

(58) Field of Classification Search
USPC .............................. 505/230, 231; 174/125.1
See application file for complete search history.

(56) References Cited

U.S. PATENT DOCUMENTS

| | | | | |
|---|---|---|---|---|
| 5,952,614 A | * | 9/1999 | Ries | 174/106 R |
| 6,005,194 A | * | 12/1999 | Ries | 174/125.1 |
| 2002/0027014 A1 | * | 3/2002 | Mukoyama et al. | 174/125.1 |
| 2008/0293575 A1 | * | 11/2008 | Hirose et al. | 505/230 |

FOREIGN PATENT DOCUMENTS

| | | |
|---|---|---|
| JP | 05-236649 | 9/1993 |
| JP | 06-052731 | 2/1994 |
| JP | 08-190818 | 7/1996 |
| JP | 10-050153 | 2/1998 |

(Continued)

OTHER PUBLICATIONS

International Search Report of PCT/JP2010/067549 dated Dec. 21, 2010 (with English Translation).

*Primary Examiner* — Colleen Dunn
(74) *Attorney, Agent, or Firm* — Fay Sharpe LLP

(57) ABSTRACT

There is provided a superconductive cable wherein an efficiency of an electric power transmission is increased to a maximum and the superconductive cable is miniaturized by strengthening a longitudinal magnetic field in a superconductive material.

A superconductive cable 1, which transmits an electric power by using superconductive material, includes a conductive portion 4 that is constructed by superconductive members spirally arranged at either a positive angle or a negative angle with respect to a standard direction defined as a longitudinal direction of the superconductive cable, and is characterized by the fact that the conductive portion 4 is composed of a plurality of layers, that the spiral angles in the respective layers are different from each other to the standard direction in order from an innermost layer 2 toward an outermost layer 3, and that magnetic fields are produced by electric currents flowing into the conductive portion 4 in the same direction as a direction in which the electric currents flow.

11 Claims, 12 Drawing Sheets

(56) References Cited

FOREIGN PATENT DOCUMENTS

| | | |
|---|---|---|
| JP | 10-097815 | 4/1998 |
| JP | 11-506260 | 6/1999 |
| JP | 11-506261 | 6/1999 |
| JP | 2001-035272 | 2/2001 |
| JP | 2002-100249 | 4/2002 |
| JP | 2003-007150 | 1/2003 |
| JP | 2003-092034 | 3/2003 |
| JP | 2006-012775 | 1/2006 |
| JP | 2006-012776 | 1/2006 |
| JP | 2006-156328 | 6/2006 |
| JP | 2008-124042 | 5/2008 |

* cited by examiner (A)

(B)

(A)

(B)

(C)

↑ : Magnetic Flux Direction (A)

(B)

SUPERCONDUCTOR CABLE AND AC POWER TRANSMISSION CABLE

TECHNICAL FIELD

The present invention relates to a superconductive cable and so forth for supplying electricity by using a superconductive material.

BACKGROUND OF ART

At present, in transmission of electricity, the alternating current power transmission is usually carried out by using copper cables. Since this electric power transmission is accompanied with Joule loss due to electrical resistance, in view of an environmental problem such as $CO_2$ emission and an energy-saving problem, it is desired that electric power transmission loss is made to be lowered, and that electric power cables are miniaturized.

In this viewpoint, in an electric power transmission cable in which a superconductive material is used, there are merits or advantages that the electric power transmission loss is small, and that a large capacity of electric power can be made to flow into the cable. Especially, in direct current power transmission, since electrical resistance is zero, it is possible to carry out the electric power transmission without the electric power transmission loss at all. In addition, according to the superconductive power transmission, since the large capacity of electric power can be transmitted by utilizing the forte of the superconductive power transmission, it is possible to omit conventional step-up and step-down transforming facilities to be installed near a power plant and a city, and thus the superconductive power transmission is economical.

As a superconductive power transmission method, there is a method using a high temperature superconductive material which can be easily cooled by liquefied nitrogen, and which features the fact that an electric current density is not so large, and such a method is put to practical use. Accordingly, in a future design of a superconductive cable, there remains a significant issue how large capacity of electric current an electrical power transmission can be carried out with.

Also, due to the fact that the superconductive material has a characteristic that there is no electrical resistance at a low temperature, it is expected that the superconductive material is applied to a variety of an energy-related engineering field, an electronics field, a medical field and so forth. In general, when an electric current is made to flow in a magnetic field, the Lorentz force acts on a quantized magnetic flux. Accordingly, when the magnetic flux is moved at a velocity of v due to that action, and when a magnetic flux density is defined as B, an induced electromotive force "$E=B \times v$" is caused. Thus, normal conduction electrons are driven in the superconductive material so that electrical resistance is created similar to a case of a metal.

A critical current density, defined as the maximum current density at which an electric current can be made to flow into the superconductive material without the electrical resistance, is determined by a magnetic flux pinning mechanism (which has the function of stopping the movement of the magnetic flux against the Lorentz force acting on the interior of the magnetic flux to thereby prevent a production of an induced electric field), and a value of the magnetic flux is decreased with the increase in the magnetic field. In an electric power transmission cable, although an intensity of the magnetic field produced in the interior of the cable is not so large, it may reach a maximum of 0.5 T, especially when the electric power transmission is carried out at a large capacity of electric current, and thus the decline in the critical current density causes a large problem.

By contrast with this case where an angle between the magnetic field and the electric current is not 0° (hereinafter, the magnetic field concerned is referred to as an inclined magnetic field, especially it is referred to as a lateral magnetic field when the angle is 90°), in a case where the magnetic field and the electric current are parallel to each other (hereinafter, the magnetic field concerned is referred to as a longitudinal magnetic field), the Lorentz force does not act on the quantized magnetic flux, so that some strange phenomena can be observed. One of the strange phenomena is that the critical current density is considerably increased (hereinafter, this phenomenon is referred to as an longitudinal magnetic field effect). Usually, in the lateral magnetic field, the critical current density is decreased with the increase in the magnetic field. However, it is known that the critical current density is reversely increased in the longitudinal magnetic field. When the electric current and the magnetic field are parallel to each other in the longitudinal magnetic field, it is referred as a force-free state. In this case, when the current density is defined as J, it is known that $J \times B=0$ is established. In this state, the magnetic flux has a strain (i.e., a force-free strain) as if a folding fan is opened, as shown in FIG. 10.

In general, in a case of a metal-based superconductive material, when an alternating current flows into a superconductive wire, it is a significant requirement that an alternating current loss is decreased. If the superconductive wire is divided into fine wires which are independent from each other, it is possible to decrease a hysteresis loss from which the alternating current loss is derived. Nevertheless, in reality, in order to take precaution against magnetic instability, the fine wires are electromagnetically bonded to each other by intervening a stabilization layer therebetween, which is composed of a normal conduction metal, so that the electric currents are bypassed around the stabilization layer. Thus, there are not merits or advantages which should be obtained from the division of the superconductive wire into the fine wires cables, so that the alternating current loss cannot be substantially decreased. This is because the self magnetic fields (i.e., the magnetic fields, produced in the circumferential direction) produced by the electric currents, penetrate into only the surface, so that no electric currents flow into the interior which the self magnetic fields do not reach.

In order to solve the aforesaid problem, a technique, in which a multi-core wire is twisted in the circumferential direction, is developed, with multi-core wire being produced by embedding the fine superconductive wires in a metal material such as copper or the like. Thus, the magnetic field in the circumferential direction can easily penetrate into the interior so that the electric currents further flow into the inner fine superconductive wires, whereby it is possible to decrease the alternating current loss. In this case, the alternating current loss is in proportion to the twist pitch.

In a case of an electric power transmission cable which needs a large capacity of electric current, since it is insufficient that the cable is constructed by only one superconductive wire, it is usual to produce a superconductive material by bundling some superconductive wires. In this case, due to a production method of the superconductive material, the individual superconductive wires are twisted in the same direction, and have the same pitch. Nevertheless, with this arrangement, the alternating current loss in the longitudinal magnetic field caused by the twist of the superconductive wires cannot be ignored though it has been ignored ever. Thus, it is usual that the individual superconductive wires are twisted in a reverse direction to a direction in which individual blank wires are twisted so that the inner longitudinal magnetic field component can be minimized.

In the case of the high temperature superconductive material, it is formed into a tape shape due to the crystallization structure and the peculiarity of the electromagnetic characteristic of the high temperature superconductive material. Thus, although the high temperature superconductive material is constructed into a multi-core structure, at the electromagnetic bonding of the multi-core structure is strong under the present conditions, and thus merits or advantages based on the multi-core structure is not so expected in a commercial network frequency.

Accordingly, in order to obtain the merits or advantages of the twist, the superconductive material is constructed by gathering together a plurality of superconductive wires, and the individual inner superconductive wires are twisted in a reverse direction to a direction in which the individual outer superconductive wires so that the magnetic field in the longitudinal direction becomes as small as possible.

In the present conditions as mentioned above, for example, techniques concerning superconductive cables are disclosed in Patent Documents 1 to 7. The technique disclosed in Patent Document 1 is directed to an alternating current superconductive cable in which individual twisted angles of conductive layers are increased or decreased stepwise between a twisted angle of the radially innermost conductive layer and a twisted angle of the radially outermost conductive layer. The technique disclosed in Patent Document 2 is directed to a calculation method to calculate twisted angles for reducing losses in a similar alternating current superconductive cable.

The technique disclosed in Patent Document 3 is directed to a multi-layered superconductive cable, having a plurality of superconductive layers concentrically combined with each other, which cable is defined as either a coaxial bi-directional cable having more than three forward current path layers or conductive layers or a united-type three-phase cable having a shield layer, wherein the cable is manufactured so that a winding pitch angle of each of the layers is represented by a cubic equation based on a core radius of a standardized layer, whereby inductance values of the individual layers are uniformed to thereby increase critical current densities.

The technique disclosed in Patent Document 4 is directed to a superconductive cable including two kinds of cable cores (i.e., a first cable core and a second cable core), having different structures, which are twisted and combined with each other, and a thermal insulating pipe in which the twisted cable cores are received. The first cable core includes a first superconductive layer which is used as a forward current path or a polar power transmission wire in direct current power transmission, and no superconductive layer except for the first superconductive layer. The second cable core includes a second superconductive layer which is used as a backward current path or a neutral wire, and no superconductive except for the second superconductive layer. The second superconductive layer has an inside diameter which is larger than an outside diameter of the first superconductive layer.

The technique disclosed in Patent Document 5 is directed to a superconductive cable including two cable cores which are twisted and combined with each other, with each of the cables being composed of a superconductive conductor layer and an outer superconductor layer which are formed of superconductive material, and a thermal insulating pipe in which the twisted cables are received. Each of the cable cores has a former, the superconductor conductor layer, an insulating layer, the outer superconductor layer and a protective layer which are arranged in order from the center thereof. In unipolar electric power transmission, each of the superconductive conductor layers included in both the cables is used as a forward current path into which a unipolar electric current flows, and each of the outer superconductor layers included in both the cables is used as a backward current path into which a backward electric current flows. In bipolar electric power transmission, the superconductive conductor layer included in one cable is used for positive power transmission, and the superconductive conductor layer included in the other cable is used for negative power transmission, with each of the outer superconductor layers included in both the cables being used as a neutral wire layer.

The technique disclosed in Patent Document 6 is directed to a superconductive cable having a plurality of high temperature oxide superconductors which are arranged in the same direction so as to be adjacent to each other, wherein electric power transmission is carried out so that respective electric currents flow into the two adjacent high temperature oxide superconductors in reverse directions to each other.

The technique disclosed in Patent Document 7 is directed to a transitional superconductive tape unit in which an even number of tape-like superconductors are transitionally twisted and combined with each other, and a piece of superconductor application equipment using the transitional superconductive tape unit, and a superconductive cable wherein the transitional superconductive tape unit is wound around a cylindrical pipe member.

PRIOR ART DOCUMENTS

Patent Documents

Patent Document 1: JP-H11-506260 A
Patent Document 2: JP-H11-506261 A
Patent Document 3: JP-2001-035272 A
Patent Document 4: JP-2006-012775 A
Patent Document 5: JP-2006-012776 A
Patent Document 6: JP-H05-236649 A
Patent Document 7: JP-2003-092034 A

SUMMARY OF THE INVENTION

Problems to be Resolved by the Invention

Nevertheless, each of the techniques disclosed in Patent Documents 1 and 2 aims at elimination of a longitudinal magnetic field, and thus it is not possible to attain a force-free state or a state approaching to the force-free state. For example, as shown in FIG. 11 by means of example, in general, each of the superconductive cables is constituted so that the longitudinal magnetic field is decreased. Thus, since none of Patent Documents 1 and 2 discloses a technique for utilizing the longitudinal magnetic field effect to thereby increase the critical current density, there is yet a problem that electric power transmission cannot be sufficiently attained. Also, before the longitudinal magnetic field can be eliminated, the individual twisted angles are changed stepwise between the twisted angle in the innermost conductive layer and the twisted angle in the outermost conductive layer in either an extent from the positive angle to the negative angle or an extent from the negative angle to the positive angle, and further the layers featured by the twisted angles included in an extent from the positive angle (or the negative angle) to the zero angle must correspond to the respective layers featured by the twisted angles included in an extent from the zero angle to the negative angle (or the positive angle). Thus, there is yet a problem that not only the layer structure needs a large number of layers, but also it is still complicated.

In the technique disclosed in Patent Document 3, when the inductance values of the individual superconductive layers are not equal to each other, the electric current distributions are ununiform in the individual superconductive layers. Thus, when the capacity of electric current is attained in the superconductive layer into which the most amount of electric current flows, the whole electric current density is determined. Accordingly, if the individual capacities of electric current in the superconductive layers, it is possible to obtain the capacity of electric current of 100% at maximum. Nevertheless, in the technique disclosed in Patent Document 3, it is impossible to obtain the capacity of electric current of more than 100% (see: FIG. 12: (FIG. 12(A) is a view showing capacities of electric current in four respective superconductive layers included in the superconductive cable; and FIG. 12(B) is a view showing how a winding pitch angle is changed)). In short, since Patent Document 3 disclose no technique for utilizing the longitudinal magnetic field effect to thereby obtain the critical current density of more than 100%, there is yet a problem that a power transmission efficiency, a power transmission loss, a miniaturization of a superconductive cable and so forth cannot be sufficiently improved.

In the techniques disclosed in Patent Documents 3 to 7, since an increase in the critical current density by the longitudinal magnetic field effect is not effectively utilized, there is yet a problem that a power transmission efficiency, a power transmission loss, a miniaturization of a superconductive cable and so forth cannot be sufficiently improved.

Therefore, the present invention has been developed to solve the above-mentioned problems, and an object of the present invention is to provide a superconductive cable in which not only can an efficiency of electric power transmission be increased to a maximum, but also it is possible to miniature the superconductive cable per se, based on an indeed new concept of strengthening a longitudinal magnetic field in a superconductive material.

Means for Solving the Problems

A superconductive cable according to the present invention transmits an electric power by using superconductive material, and comprises a conductive portion that is constructed by superconductive members spirally arranged at either a positive angle or a negative angle with respect to a standard direction defined as a longitudinal direction of the superconductive cable, characterized by the fact that the conductive portion is composed of a plurality of layers, that the spiral angles in the respective layers gradually becomes larger in relation to the standard direction in order from an innermost layer toward an outermost layer, and that magnetic fields are produced by electric currents flowing into the conductive portion in the same direction as a direction in which the electric currents flow.

As stated above, in the superconductive cable according to the present invention, since the conductive portion is constructed by the superconductive members spirally arranged at either the positive angle or the negative angle with respect to the standard direction defined as the longitudinal direction of the superconductive cable, and since the magnetic fields are produced by the electric currents flowing into the conductive portion in the same direction as the direction in which the electric currents flow, it is possible to obtain merits or advantage that a large capacity of electric current can be transmitted by utilizing an increase in acritical current density due to a longitudinal magnetic field effect.

Also, since the conductive portion is composed of the plurality of layers, it is possible produce many longitudinal magnetic fields. On the other hand, since the spiral angles in the respective layers gradually becomes larger in relation to the standard direction in order from the innermost layer toward the outermost layer, it is possible to effectively utilize the longitudinal magnetic field effect, taking into consideration a force-free strain. Thus, it is possible to obtain merits or advantage that a large capacity of electric current can be transmitted.

Further, when the spiral angles in the respective layers gradually becomes larger in relation to said standard direction in order from the innermost layer toward the outermost layer within an range from 0° to 60°, it is possible to more effectively utilize the longitudinal magnetic field effect, taking into consideration the force-free strain. Thus, it is possible to obtain the merits or advantage that a large capacity of electric current can be transmitted.

Also, the superconductive cable according to the present invention is characterized by the fact that the innermost layer of the conductive portion is arranged so as to be parallel to the standard direction.

As stated above, in the superconductive cable according to the present invention, since the innermost layer of the conductive portion is arranged so as to be parallel to the standard direction, it is possible to construct the superconductive cable in which a force-free state or a state approaching to the force-free state can be established, whereby it is possible to obtain merits or advantages that a large capacity of electric current can be transmitted. In short, as shown in FIG. 12(B), in the case of the present invention, the innermost layer of the conductive portion is parallel to the standard direction (i.e., the angle in the innermost angle is zero to t standard direction), and the angles are linearly changed.

Further, the superconductive cable according to the present invention is characterized by the fact that each of the angles, at which the conductive portion is constructed, is regulated as the angle at which that each of the electric currents flowing through the conductive portion and the corresponding magnetic flux density are the same as each other.

As stated above, in the superconductive cable according to the present invention, since each of the angles, at which the conductive portion is constructed, is ID regulated so that the electric current is parallel to the magnetic flux density so that the longitudinal magnetic field effect can be utilized to a maximum in the force-free state. Thus, it is possible to obtain merits or advantages that an efficiency of electric power transmission can be considerably improved.

Furthermore, the superconductive cable according to the present invention is characterized by the fact that the superconductive members are composed of a plurality of superconductive tapes, that the conductive portion is constructed from the superconductive tapes which are juxtaposed with each other, and that each of the superconductive tapes includes a stabilization layer which serves as a bypass for the electric current flowing into the corresponding superconductive tape.

As stated above, in the superconductive cable according to the present invention, since the superconductive members are composed of the plurality of superconductive tapes, since the conductive portion is constructed from the superconductive tapes which are juxtaposed with each other, and since each of the superconductive tapes includes the stabilization layer which serves as the bypass for the electric current flowing into the corresponding superconductive tape, although a trouble (for example, a deterioration, a crack, a thermal disturbance, a breakage or the like) occurs in the superconductive tape, the electric current can flows into the stabilization layer, whereby it is possible to obtain merits or advantages that a decline in the electric power transmission efficiency can be suppressed to a minimum.

Furthermore, the superconductive cable according to the present invention is characterized by the fact that the superconductive cable includes: an inner layer portion that is defined by the layers in the conductive portion; an outer layer portion which is defined as a conductive portion composed of superconductive members, with the superconductive members of the outer layer portion being spirally arranged with respect to the standard direction in the reverse spiral direction to the spiral direction in which the superconductive members of the inner layer portion are spirally arranged; and an insulating layer provided between the inner layer portion and the outer layer portion.

As stated above, in the superconductive cable according to the present invention, since the superconductive cable includes: the inner layer portion that is defined by the layers in the conductive portion; the outer layer portion which is defined as the conductive portion composed of the superconductive members, with the superconductive members of the outer layer portion being spirally arranged with respect to the standard direction in the reverse spiral direction to the spiral direction in which the superconductive members of the inner layer portion are spirally arranged; and the insulating layer provided between the inner layer portion and the outer layer portion, it is possible to utilize the superconductive cable as a coaxial bi-directional power transmission cable, and the respective electric currents flow into the inner and outer layer portions in the reverse directions to each other so that the longitudinal magnetic field is deliberately strengthened in the direction which is parallel to the standard direction, resulting in an increase in the critical current density. Thus, it is possible to obtain merits or advantages that a large capacity of electric current can be transmitted. Further, due to the fact that the respective electric currents flow into the inner layer portion and the outer layer portion in the reverse directions to each other, the circumferential magnetic fields, which are respectively produced by the inner layer portion and the outer layer portion in the circumferential direction of the outside of the superconductive cable, are canceled out by each other. Thus, while an electric power is transmitted by the outer layer portion transmission, the outer layer portion can serve as a shield, whereby it is possible to obtain merits or advantages that no shield is needed.

In particular, as shown in FIG. 11, although it is usual that the pitch angle is regulated so that the longitudinal magnetic field is decreased, according to the present invention, the pitch angle is regulated so that the longitudinal magnetic field is positively produced, whereby the longitudinal magnetic field can be utilized to a maximum. In this case, since there is only the longitudinal magnetic field in the center portion, the pitch angle in the innermost layer is zero, i.e., the innermost layer is parallel to the standard direction.

Furthermore, the superconductive cable according to the present invention is characterized by the fact that the outer layer portion is composed of a plurality of layers, and that the spiral angles in the respective layers are different from each other to the standard direction in order from an innermost layer toward an outermost layer.

As stated above, in the superconductive cable according to the present invention, since the outer layer portion is composed of the plurality of layers, and since the spiral angles in the respective layers are different from each other to the standard direction in order from the innermost layer toward the outermost layer, not only can a state approaching to a force-free state be realized in even the outer layer portion, but also it is possible to effectively utilize the longitudinal magnetic effect, taking into consideration a force-free strain, whereby it is possible to obtain merits or advantages that an efficiency of electric power transmission can be improved.

Furthermore, the superconductive cable according to the present invention is characterized by the fact that the innermost layer of the outer layer portion defined as the conductive portion are arranged so as to be parallel to the standard direction.

As stated above, in the superconductive cable according to the present invention, since the innermost layer of the outer layer portion defined as the conductive portion are arranged so as to be parallel to the standard direction, a state approaching to a force-free state can be realized, whereby it is possible to obtain merits or advantages that an efficiency of electric power transmission can be improved by utilizing the longitudinal magnetic field effect.

Furthermore, the superconductive cable according to the present invention is characterized by the fact that a direction in which an electric current flows into the inner layer portion and a direction in which an electric current flows into the outer layer portion are reverse to each other with respect to the standard direction.

As stated above, in the superconductive cable according to the present invention, since the direction in which the electric current flows into the inner layer portion and the direction in which the electric current flows into the outer layer portion are reverse to each other with respect to the standard direction, the longitudinal magnetic field produced by the electric current flowing into the inner layer portion and the longitudinal magnetic field produced by the electric current flowing into the outer layer portion are added to each other so that the whole longitudinal magnetic field can be strengthened. Thus, a critical current density can be considerably increased, whereby it is possible to obtain merits or advantages that a large capacity of electric current can be transmitted. Also, since the lateral magnetic field produced by the electric current flowing into the inner layer portion and the lateral magnetic field produced by the electric current flowing into the outer layer portion are canceled out by each other, it is possible to obtain merits or advantages that the shield of the magnetic field can be ensured at the outside of the superconductive cable without needing an additional magnetic field shield.

Furthermore, an alternating current power transmission cable according to the present invention comprises three superconductive cables, each of which is set forth above, and is characterized by the fact that the three superconductive cable are bundled in a three-phase manner.

As stated above, in the alternating current power transmission cable according to the present invention, since the above-mentioned superconductive cables are utilized, it is possible to obtain merits or advantages that a large capacity of electric current can be efficiently transmitted in many existing alternating current power transmission systems.

Further more, the superconductive cable according to the present invention is characterized by the fact that each of the superconductive members at least includes a tape-like superconductive layer into which an electrical current flows in a superconductive state, that the superconductive members are juxtaposed with each other to thereby define the conductive portion, and that the tape-like superconductive layer has a thickness falling within a range from 0.1 μm to 0.4 μm.

As stated above, in the superconductive cable according to the present invention, since each of the superconductive members at least includes the tape-like superconductive layer, and since the superconductive layer has the thickness falling within the range from 0.1 μm to 0.4 μm, not only it is possible to prevent a decline in the critical current density due to the fact that the superconductive layer is thickened up, becomes thicker, but also it is possible to construct the superconductive cable in which a compete force-free state or a state approaching to the force-free state can be attained due to the fact that the electric current linearly flows into the tape-like superconductive layer. Thus, it is possible to obtain merits or advantages that an efficiency of electric power transmission can be considerably improved.

BRIEF EXPLANATIONS OF DRAWINGS

EXPLANATION OF REFERENCES

1 Superconductive Cable
2 Innermost Layer
3 Outermost Layer
4 Conductive Portion
5 Insulating Layer
6 Superconductive Tape
8 Innermost Layer
9 Outermost Layer
10 Stabilization Layer
11 Superconductive Layer
12 Intermediate layer
13 Base Member
15 Superconductive Filament
16 Sheath Member
20 Alternating Current Power Transmission Cable
22 Inner Layer Portion
23 Outer Layer Portion
24 Thermal Insulating Layer
25 Corrosion-Proof Layer

MODES FOR EMBODYING THE INVENTION

Embodiments of the present invention will now be explained below. It is possible to embody the present invention in many various modes. Thus, the present invention should not be interpreted by only descriptions on the embodiments of the present invention. Also, in the embodiments, the elements similar to each other are indicated by the same reference.

First Embodiment of the Invention

Figure 1:
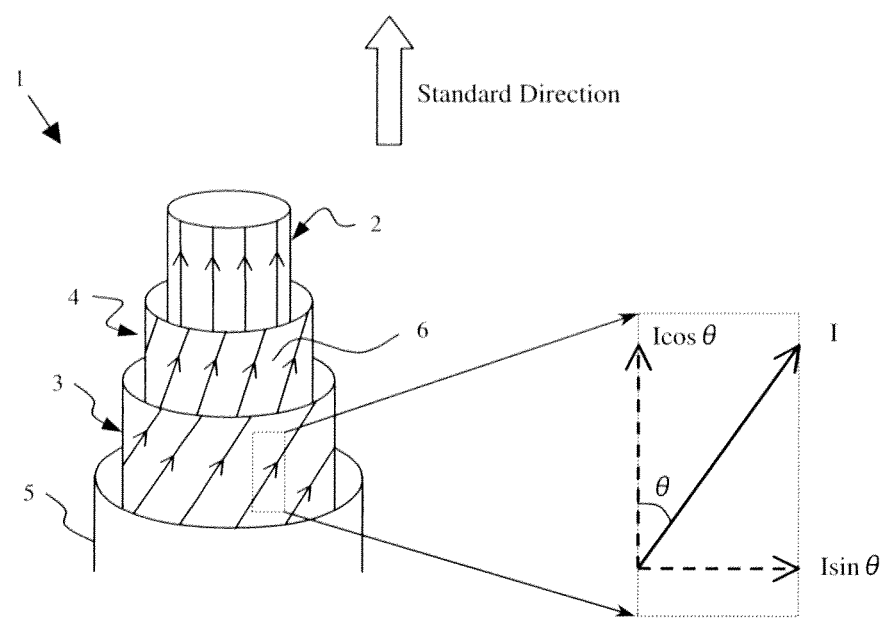
FIG. 1 is a view showing an arrangement of a superconductive cable according to a first embodiment.
Figure 2:
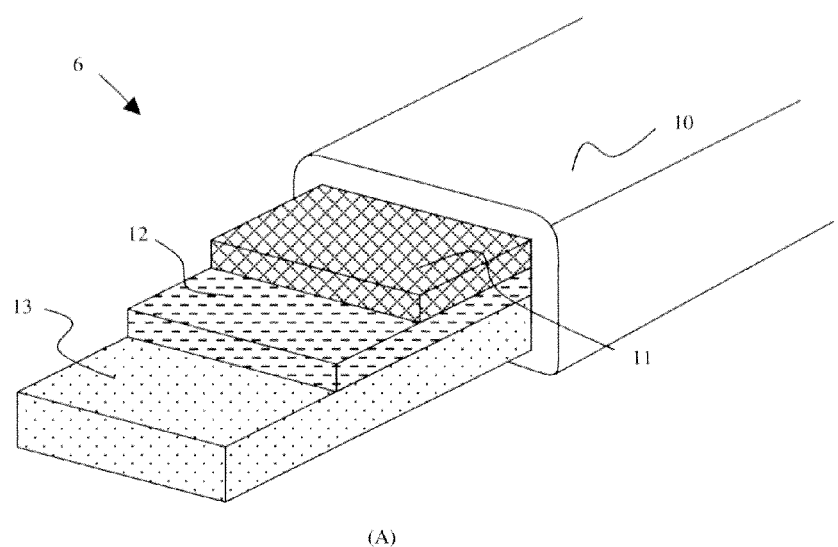
FIG. 2 is views showing arrangements of respective super-conductive tapes in the super-conductive cable according to the first embodiment.
Figure 2:
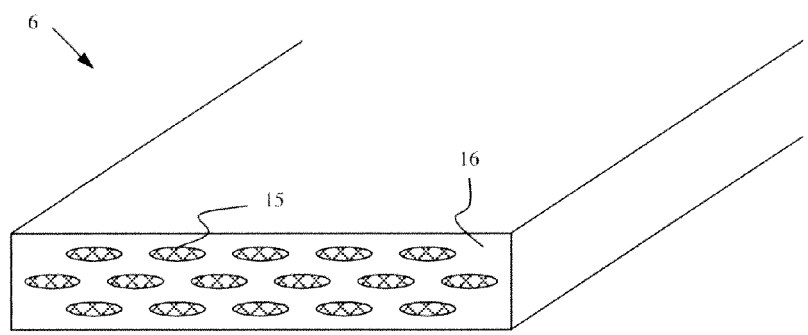
Figure 3:
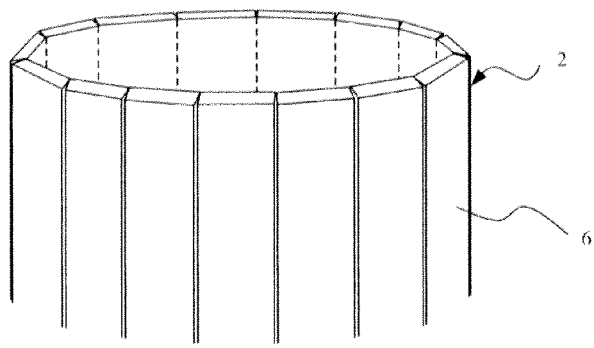
FIG. 3 is views showing an arrangements of a conductive portion in the superconductive cable according to the first embodiment.
Figure 3:
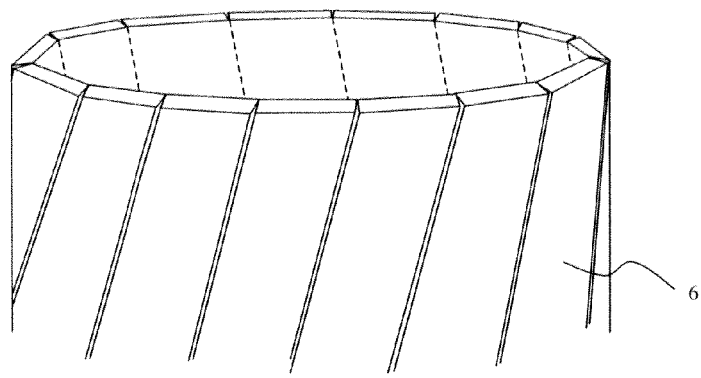
Figure 3:
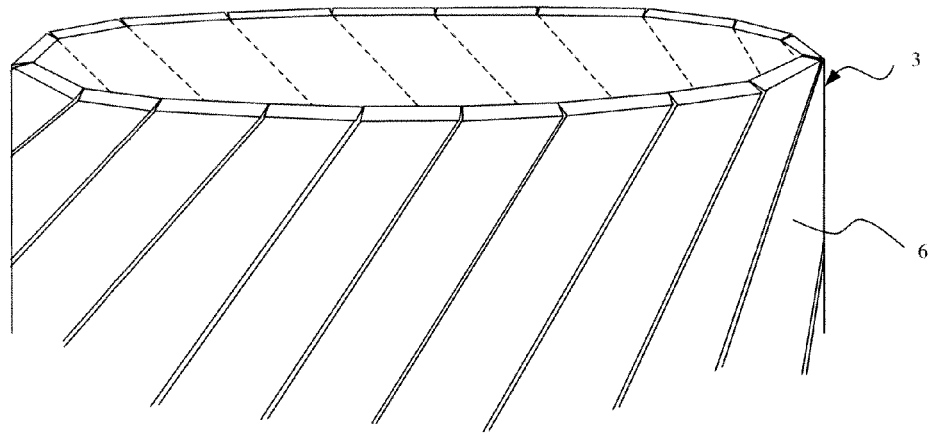

With reference to FIGS. 1 to 3, a superconductive cable according to this embodiment will explained. FIG. 1 is a view showing an arrangement of the superconductive cable according to this embodiment; FIG. 2 is a view showing an arrangement of a superconductive tape in the superconductive cable according to this embodiment; and FIG. 3 is a view showing an arrangement of a conductive portion in the superconductive cable according to this embodiment.

In FIG. 1, the superconductive cable 1 is configured into a circular cylindrical shape, and includes a conductive portion 4 featuring a multi-layered structure (shown as a 3-layered one in the drawing), which is composed of a plurality of layers having different cross-sectional diameters, and the multi-layered conductive portion 4 is covered with an electric insulating layer 5. A hollow space is defined between two adjacent layers, and is filled with a cooling medium such as liquefied nitrogen. The conductive portion 4 is constructed from a plurality of superconductive tapes 6 which are juxtaposed with each other, and the superconductive tapes in each layer are spirally arranged at either a positive angle or a negative angle with respect to a standard direction which is defined as a longitudinal direction of the superconductive cable 1.

Also, in the conductive portion 4, spiral angles, at each of which the superconductive tapes 6 are arranged in a corresponding layer, are different from each other in order from the innermost layer 2, which is placed at the innermost side in the radial direction, toward the outermost layer 3 which is placed at the outermost side in the radial direction. In FIG. 1, the arrows in each of the layers indicate not only directions in which the superconductive tapes 6 are arranged but also directions in which electric currents flow. In short, the electrical currents spirally flow along the standard direction for an electric power transmission.

When each of the electric currents flowing through the conductive portion 4 is defined as I, the electric current I may be divided into a longitudinal component which is parallel to the standard direction and a lateral component which is perpendicular to the standard direction. Due to the fact that the electric current I flows through the conductive portion 4, when a spiral angle to the standard direction is defined as $\theta$, the longitudinal component current ($I \cos \theta$) produces a lateral magnetic field with respect to the superconductive cable 1, and the lateral component current ($I \sin \theta$) produces a longitudinal magnetic field with respect to the superconductive cable 1. As stated hereinbefore, since a critical current density of a superconductor is increased in the longitudinal magnetic field, it is possible to transmit a large capacity of electric power.

Herein, spiral angles of the superconductive tapes 6 are explained. The superconductive tapes 6 are arranged at a spiral angle which is set so that a direction of the flowing current and a direction of the longitudinal magnetic field are ideally parallel to each other, i.e., an that the current flows in a force-free state in which (J×B=0) is satisfied. Although a concrete instance of the setting of the spiral angle will be explained in an embodiment in detail later, when the spiral angle of 0° is defined in the standard direction, the spiral angles gradually becomes larger in order from the innermost layer 2 toward the outermost layer 3 in either a positive direction or a negative direction. This is because the spiral angles must become gradually larger so that the force-free state can be obtained, due to the fact that a self magnetic field of the current becomes larger toward the outside. Also, the spiral angle in the innermost layer 2 should be set so that the innermost layer is made to be parallel to the standard direction (the angle of 0°), so that a state more approaching to the force-free state can be obtained. When a radial thickness of each of the superconductive layers is sufficiently small, it is possible to calculate the spiral angle in each superconductive layer with high precision by a flat plate approximation method stated in the below-mentioned embodiments. Although the radial thickness of each of the superconductive layers is not sufficiently small, it is possible to find the spiral angle in each superconductive layers by numerically analyzing the Maxwell's Equations, using the cylindrical coordinates.

Note, in FIG. 1, although the conductive portion 4 is formed as the 3-layered structure, the number of layers is not limited as long as it is formed as a multi-layered structure. Also, although not shown in the drawing, the superconductive tapes 6 in each layer may be provided so as to be adhered to a support member for supporting the superconductive cable 1. Further, although not shown in the drawing, the superconductive cable may be provided with a thermal insulating layer for shielding it from heat, a shielding layer for shielding it from a magnetic field, a corrosion-proof layer, and so forth as external layers around the electric insulating layer.

With reference to FIG. 2, an arrangement of each of the superconductive tapes 6 will be explained. FIG. 2(A) is a view showing an instance of an arrangement of an RE-based-coated wire material by means, and FIG. 2(B) is a view showing an instance of an arrangement of a Bi-based-silver sheathed wire material. In FIG. 2(A), the superconductive tape 6 includes a base member 13 for insuring a plane orientation, an intermediate layer 12 for preventing diffusion, a superconductive layer 11 through which an electric current flows, and a stabilization layer 10, formed of silver (Ag), with which a whole layered structure composed of the three layers is coated. The base member 13 has a thickness falling within a range from 50 μm to 100 μm; the intermediate layer 12 has a thickness falling within a range from 0.5 μm to several microns; the superconductive layer 11 has a thickness of at most 1 μm; and the stabilization layer 10 has a thickness falling within a range from several microns to several tenth microns. In short, in the superconductive tape 6, the superconductive layer 11 is very thin so as to ignore the thickness thereof. Thus, although a trouble such as a deterioration, a crack, a thermal disturbance, d breakage or the like occurs in the superconductive tape 11 to thereby create a voltage, the superconductive cable is stabilized by the stabilization layer 10 so that the electric current is bypassed around the stabilization layer, whereby it is possible to suppress a decline in an electric power transmission efficiency to a minimum. Also, when the thermal disturbance takes place, the stabilization layer 10 has a function of absorbing heat.

Herein, the thickness of the superconductive layer 11 will be further explained in detail. At present, an investigation to thicken the thickness of the superconductive layer 11 is carried out to aim at increasing the critical current density (inclusive of improvement a high magnetic field characteristic), and it is possible to improve the high magnetic field characteristic when the thickness of the superconductive layer 11. Nevertheless, due to the fact that a bonding strength of the interfaces of the superconductive layer 11 is small, meanders of the electric current are caused so that not only it is difficult to attain a complete force-free state, but also it is difficult to considerably increase a critical current even under the longitudinal magnetic field. Also, due to the fact that the thickness of the superconductive layer 11 is thickened, the critical current density declines so that it is difficult that a large quantity of electric current is made to flow.

Thus, in this embodiment, especially, in the RE-based-coated wire material, the superconductive layer 11 has the thickness of at most 0.4 μm, preferably, falling within a range from 0.1 μm to 0.3 μm. If it is so set, the large quantity of electric current can be made to flow by utilizing the high critical current density under the low magnetic field. This is especially advantageous in an environment (under the low magnetic field) in which an electric power cable is used. Also, as stated above, when the thickness of the superconductive layer 11 is thickened, the critical current density declines. Nevertheless, when the thickness of the superconductive layer 11 falls within the range from 0.1 μm to 0.4 μm, it is possible to prevent the decline in the critical current density. An example of a referential literature is shown (See: Referential Literature (S. R. Foltyn, L. Civale, J. L. MacManus-Driscoll, Q. X. Jia, B. Maiorov, H. Wang and M. Maley: Nature Material Vol. 6, September 2007, P. 631)). Further, when the thickness of the superconductive layer 11 falls within the range from 0.1 μm to 0.4 μm, it is possible to suppress the meanders of the electric current so that the electric current linearly flows, whereby it is possible to easily attain the complete force-free state or the state approaching to the force-free state.

Note, although there are a little difference among manufacturing methods, when the thickness of the superconductive layer 11 is too small, it may include an area, through which an electric current cannot flow due to a strain based on a lattice matching to the base member 13, a deviation among chemical components or the like compounds difference, and thus it is desirable that the superconductive layer has the thickness of at least 0.1 μm.

In FIG. 2(B), the superconductive tape 6 features an arrangement in which a plurality of superconductive filaments 15 are embedded in a sheath member 16 such as a silver material, a silver alloy material or the like, and has a width falling within a range from about 4.0 mm to about 4.5 mm, and a thickness falling within a range from about 0.2 mm to about 0.25 mm. In manufacture of the superconductive tape 6 shown in FIG. 2(B), first, a pipe composed of either a silver material or a silver alloy material is filled with a superconductive powder, and is subjected to a wire drawing process to thereby produce a single-core wire. Then, a plurality of single-core wires subjected to the wire drawing process are inserted into in another pipe filaments to thereby obtain a multi-core wire. Then, the multi-core wire is further subjected to a wire drawing process, and is formed into a tape-like shape, thereby resulting in production of the superconductive tape 6. Note, similar to the case of FIG. 2(A), although a trouble such as a deterioration, a crack, a thermal disturbance, a breakage or the like occurs in the superconductive filaments 15 to thereby create a voltage, the superconductive cable is stabilized by the sheath member 16 so that the electric current is bypassed around the sheath member 16, whereby it is possible to suppress a decline in an electric power transmission efficiency to a minimum. Also, when the thermal disturbance takes place, the sheath member 16 has a function of absorbing heat.

Note, in the case of the superconductive tape 6 of FIG. 2(B), a high critical current density also can be utilized so that a large quantity of electric current is made to flow by thinning a thickness of the superconductive filaments 15 due to the same reason as in the case of FIG. 2(A). Also, since the electric current linearly flows, it is possible to easily attain the complete force-free state or the state approaching to the force-free state so that the large quantity of electric current can flow.

FIG. 3 is views showing an arrangement of the conductive portion 4. FIG. 3(A) is the view showing a structure of the innermost layer 2 of the conductive portion 4; FIG. 3(B) is the view showing a structure of the outside layer adjacent to the innermost layer 2 of the innermost layer 4; and FIG. 3(C) is the view showing a structure of the outermost layer 3 of the conductive portion 4. In each of the layers, the superconductive tapes 6 are cylindrically juxtaposed with each other so as to define the layer. In FIG. 3(A), the superconductive tapes 6 are arranged so as to be parallel to the standard direction due to the innermost layer 2; in FIG. 3(B), the spiral angle of the superconductive tapes 6 becomes larger in comparison with the angle of the standard direction; and, in FIG. 3(C), the spiral angle of the superconductive tapes 6 becomes further larger in comparison with the case of FIG. 3(B), whereby the current flowing paths of the electric current are defined so that the force-free state can be realized. Thus, the electric currents flow along the superconductive tapes 6, i.e., the superconductive cable 1 is arranged so that the electric power is transmitted in the longitudinal direction thereof. Although not shown in the drawing, as stated above, the superconductive cable 1 includes a support member which is provided in the inner space of each of the cylindrical layers to support the superconductive cable 1, and to which the superconductive tapes 6 can be adhered.

Note that the superconductive cable 1 according to this embodiment can be applied to both direct current power transmission and alternating current power transmission. In the direct current power transmission, the superconductive cable per se is used as a single-directional direct current power transmission cable. In the alternating current power transmission, the three superconductive cables are bundled in a three-phase manner so as to be used as a three-phase alternating current power transmission cable.

As stated above, in the superconductive cable according to this embodiment, the superconductive cable has the conductive portion formed of the superconductive members which are spirally arranged at either the positive angle or the negative angle with respect to the standard direction defined as the longitudinal direction of the superconductive cable, so that the longitudinal magnetic field can be produced in the same direction as the flowing direction of the electric current, whereby it is possible to transmit the large capacity of electric power by utilizing the fact that the critical current density is increased due to the longitudinal magnetic field effect. Also, not only can the many longitudinal magnetic fields be produced due to the fact that the conductive portion is formed of the plural layers, but also it is possible to effectively utilize the longitudinal magnetic field effect, taking the force-free strain into consideration, due to the fact that the spiral angles to the standard direction are different from each other in order from the innermost layer toward the outermost layer, whereby it is possible to transmit the large capacity of electric power.

Also, due to the fact that the innermost layer of the conductive portion is arranged so as to be parallel to the standard direction, it is possible to obtain the force-free state or the state approaching to the force-free state, whereby the efficiency of the electric power transmission can be considerably improved.

Further, due to the fact that each of the spiral angles, at which the conductive portion is constructed, is regulated as an angle at which that each of the electric currents flowing through the conductive portion and a corresponding magnetic flux density are parallel to each other, it is possible to utilize the longitudinal magnetic field effect to a maximum, whereby the efficiency of the electric power transmission can be considerably improved.

Furthermore, due to the fact that the superconductive members are defined as the superconductive tapes, each of which has the stabilization layer which serves as a bypass for the electric current flowing through a corresponding superconductive tape, although a trouble (for example, a deterioration, a crack, a thermal disturbance, a breakage or the like) occurs in the superconductive tape, the superconductive cable is stabilized by the stabilization layer so that the electric current is bypassed around the stabilization layer, whereby it is possible to suppress a decline in the electric power transmission efficiency to a minimum.

Second Embodiment of the Invention

Figure 4:
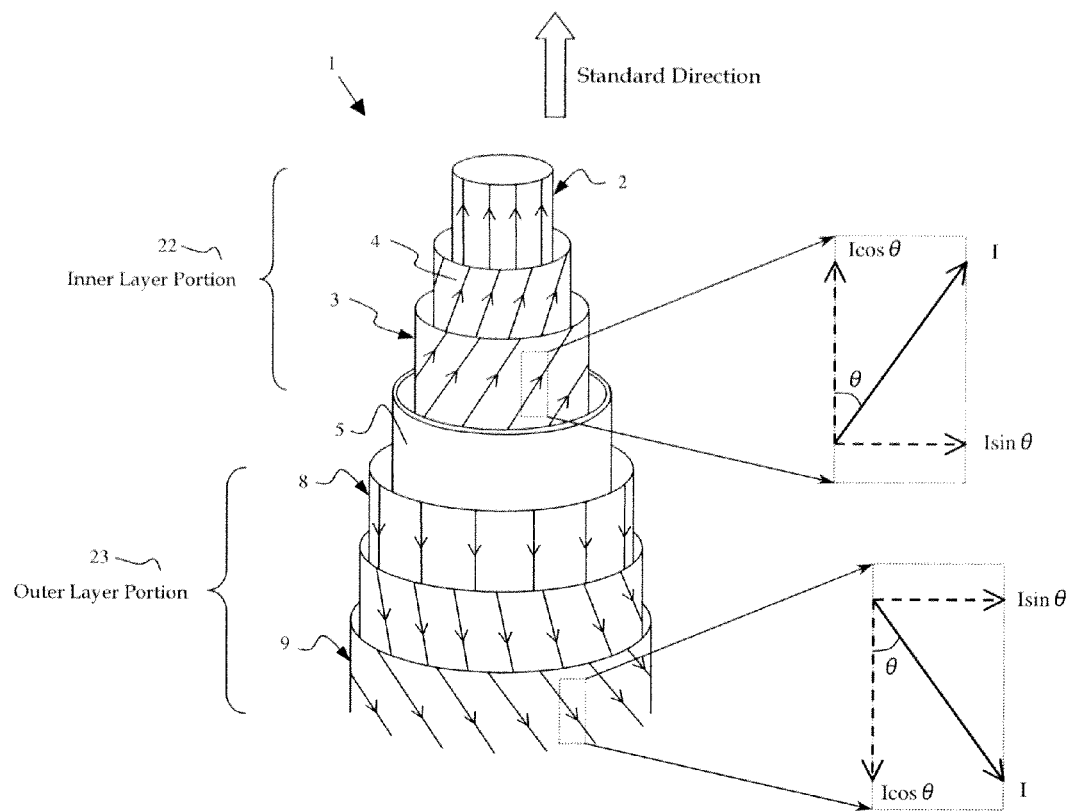
FIG. 4 is a view showing an arrangement of a superconductive cable according to a second embodiment.
Figure 5:
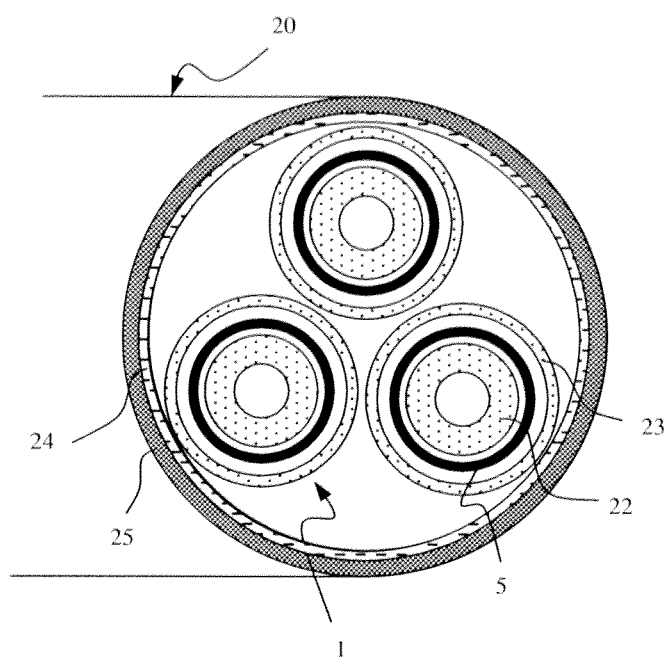
FIG. 5 is a cross-sectional view of a three-phase alternating current power transmission cable using the superconductive cables according to the second embodiment.

With reference to FIGS. 4 and 5, a superconductive cable according to this embodiment will now be explained. FIG. 4 is a view showing an arrangement of the superconductive cable according to this embodiment, and FIG. 5 is a cross-sectional view of a three-phase alternating current power transmission cable using the superconductive cables according to this embodiment. Note, in the description of this embodiment, the repetition of the same in the aforesaid first embodiment is omitted.

The superconductive cable according to this embodiment corresponds to the superconductive cable according to the aforesaid first embodiment which is reformed as a coaxial bi-directional cable, and this coaxial bi-directional cable includes an inner layer portion defined as a conductive portion in which superconductive members are spirally arranged, an outer layer portion defined as a conductive portion in which superconductive members are spirally arranged with respect to the standard direction in the reverse spiral direction to the spiral direction in which the superconductive members of the inner layer portion are spirally arranged, and an insulating layer provided between the inner layer portion and the outer layer portion.

With reference to FIG. 4, in the superconductive cable 1 according to this embodiment, the inner layer portion 22 includes the layers of the conductive portion 4 of the superconductive cable 1 according to the aforesaid first embodiment, and the outer layer portion 23 is formed around the outside of the insulating layer 5 in the reverse spiral direction to the spiral direction of the inner layer portion 22. In short, when the spiral direction of the inner layer portion 22 is defined as a positive direction with respect to the standard direction, the spiral direction of the outer layer 23 is negative. When the spiral direction of the inner layer portion 22 is defined as a negative direction with respect to the standard direction, the spiral direction of the outer layer 23 is positive. Similar to the inner portion 22, the outer layer portion 23 is formed as the conductive portion constructed from the superconductive members.

Similar to the case of the aforesaid first embodiment shown in FIGS. 2 and 3, the conductive portion 4 including the layers is constructed from a plurality of superconductive tapes 6 which are juxtaposed with each other. In FIG. 4, the arrows indicate not only directions in which the superconductive tapes 6 are arranged but also directions in which electric currents flow. Due to the fact that the directions in which the electric currents flow into the inner layer portion 22 are reverse to the directions in which the electric currents flow into the outer layer portion 22, it is necessary to provide the insulating layer 5 between the inner layer portion 22 and the outer layer portion 23.

Similar to the case of FIG. 1, when a spiral angle to the standard direction is defined as θ, an electric current I in the inner layer portion 22 can be divided into a longitudinal component current of I cos θ and a lateral component current of I sin θ. The longitudinal component current of I cos θ produces a lateral magnetic field in a circumferential direction (the counterclockwise direction when observing from the standard direction), and the lateral component current of I sin θ produces a longitudinal magnetic field in an axial direction of the cable (the standard direction). On the other hand, an electric current I in the outer layer portion 23 can be also divided into a longitudinal component current of I cos θ and a lateral component current of I sin θ. Nevertheless, the longitudinal component current of I cos θ produces a lateral magnetic field in the reverse direction (the clockwise direction when observing from the standard direction) to the direction of the lateral magnetic field produced in the inner layer portion 22, and the lateral component current of I sin θ produces a longitudinal magnetic field in the same direction (the standard direction) as the direction of the longitudinal magnetic field produced in the inner layer portion 22. In short, both the lateral magnetic fields in the circumferential direction are canceled out by each other, and both the longitudinal magnetic fields in the axial direction are strengthened by each other. This arrangement is based on an indeed new concept that both the longitudinal magnetic fields are strengthened by each other, and that is not conventionally known.

As shown in FIG. 4, since both lateral magnetic fields are canceled out by each other, a shield is unnecessary. Also, since both the longitudinal magnetic fields are strengthened by each other, a critical current density is increased due to the longitudinal magnetic field effect, it is possible to transmit a large capacity of electric power.

Similar to the case of the inner layer portion 22, when the spiral angle of 0° is defined in the standard direction, the spiral angles on the superconductive tapes 6 in the outer layer portion 23 become gradually larger in order from an innermost layer 8 toward an outermost layer 9 in the reverse way to the spiral angles in the inner layer portion 22. Also, the innermost layer 8 in the outer layer portion 22 may be parallel to the standard direction. By arranging the superconductive tapes 6 at these spiral angles, electric currents can flow into the outer layer portion 23 at the force-free state or the state approaching to the force-free state.

Note, in FIG. 4, although each of the inner layer portion 22 and the outer layer portion 23 comprises the conductive portion 4 having the three-layered structure, it may be formed as a multi-layered structure including at least one layers. Especially, due to the fact that an amount of wire materials for manufacturing the superconductive tapes 6 becomes large, it may be regulated in accordance with a capacity of electric current, a cost, a quantity of work and so forth. Also, although not shown in the drawing, the superconductive cable may be provided with a thermal insulating layer for shielding it from heat, a corrosion-proof layer and so forth as external layers around the outer layer portion 23.

Further, the outer layer portion 23 may be defined as a single layer portion. Also, the respective spiral angles in the layers the outer layer portion 23 may be equal to each other.

Furthermore, although the spiral angles from the innermost layer to the outermost layer may be not necessarily changed in order from the zero degree, the change should be made at either positive spiral angles or negative spiral angles to the standard direction.

The superconductive cable 1 according to this embodiment can be applied to both direct current power transmission and alternating current power transmission. In the direct current power transmission, the superconductive cable per se is used as a bi-directional direct current power transmission cable. In the alternating current power transmission, the three superconductive cables are bundled in a three-phase manner so as to be used as a three-phase alternating current power transmission cable.

An instance of a three-phase alternating current power transmission cable 20, which is obtained by bundling the bundled three superconductive cables 1, will now be explained. In FIG. 5, the alternating current power transmission cable 20 includes a bundle of the three superconductive cables 1. The bundle of the superconductive cables is wholly covered with a thermal insulating layer 24 for shielding it from heat and a corrosion-proof layer 25.

In the inner layer portion 22 of each of the superconductive cables 1, the superconductive tapes 6 are spirally arranged, as shown in FIG. 4, and thus the electric currents are made to flow into the superconductive tapes 6 so that the force-free state is obtained. In short, the critical current density is increased due to the longitudinal magnetic field effect, and thus it is possible to transmit a large capacity of electric power. Also, due to the existence of the outer layer portion 23, it is possible to cancel out the lateral magnetic field produced by the inner layer portion 22.

Note that FIG. 5 shows only the instance of the alternating current power transmission cable. It is possible to construct another alternating current power transmission cable by utilizing the superconductive cables 1, and the present invention is not limited to only the alternating current power transmission cable. For example, as shown in FIG. 5, each of the cable cores may include a conductive layer portion (the inner layer portion 22) provided inside, and a shield layer portion (the outer layer portion 23) provided outside. Then, these cable cores are bundled in a three-phase manner, and the whole of the bundle is thermally insulated and protected to thereby manufacture a three-phase alternating current power transmission cable. On the other hand, each of the cable cores may include only a conductive layer portion (the inner layer portion 22). Then, these cable cores are bundled in a three-phase manner; the whole of the bundle is shielded by a shield layer portion (the outer layer portion 23); and the shield bundle is thermally insulated and protected to thereby manufacture a three-phase alternating current power transmission cable.

As stated above, since the superconductive cable according to this embodiment includes the inner layer portion defined as the conductive portion, the outer layer portion which is spirally arranged with respect to the standard direction in the reverse spiral direction to the spiral direction in which the inner layer portion is spirally arranged as the conductive portion, and the insulating layer provided between the inner layer portion and the outer layer portion, it can be utilized as the coaxial bi-directional power transmission cable. Due to the fact that the direction in which the electric currents flows into the inner layer portion is reverse to the direction in which the electric currents flow into the outer layer portion, both the longitudinal magnetic fields are strengthened by each other in the same direction so that the critical current density is increased, whereby it is possible to transmit a large capacity of electric power.

Also, due to the fact that the direction in which the electric currents flows into the inner layer portion is reverse to the direction in which the electric currents flow into the outer layer portion, both the lateral magnetic fields produced in the respective inner and outer layer portions in the circumferential direction are canceled out by each other so that the inner layer portion not only can carry out power transmission, but also can serve as a shield layer, and thus no shield layer is necessary.

Further, due to the fact that the outer layer portion includes the plural layers, and that the spiral angles in the outer layer portion to the standard direction are different from each other in order from the innermost layer toward the outermost layer, not only can the state approaching to the force-free state be realized in even the outer layer portion, but also it is possible to effectively utilize the longitudinal magnetic field effect, taking the force-free strain into consideration, whereby the efficiency of the electric power transmission can be improved.

Furthermore, due to the fact that the innermost layer in the outer layer portion is arranged so as to be parallel to the standard direction, the state approaching to the force-free state can be realized, and thus it is possible to improve the efficiency of the electric power transmission, whereby the efficiency of the electric power transmission can be improved.

Furthermore, due to the fact that the alternating current power transmission cable can be constructed by the superconductive cables, it is possible to obtain merits or advantages that a large capacity of electric power can be efficiently transmitted in many present alternating current power transmission systems.

Although the present invention is explained by the aforesaid embodiments, a scope of the present invention is not limited to the descriptions of the embodiments, and it should be understood that various changes and modifications may be made to the aforesaid embodiments. Thus, the changed and modified embodiments should be also encompassed within the scope of the present invention. This is apparent from the descriptions of the claims and the descriptions of "MEANS FOR SOLVING THE PROBLEMS".

EXAMPLE 1

With respect to the superconductive cable 1 as shown in FIG. 4, a quantity of electric current flowing into the superconductive cable was assumed, and it was inspected how merits the superconductive cable could have by the longitudinal magnetic field effect in comparison with a conventional power transmission method. According to the recent researches, due to the fact that superconductive wire materials are costly at present, it is said that power transmission at approximately 25 kA is efficient. However, in the near future, it is expected that the cost of the superconductive wire materials will considerably decline. Thus, in order to exercise the merit of the superconductive cable according to the present invention to a maximum, the structure of the superconductive cable 1 was designed on the assumption that direct current power transmission was carried out at 50 kA, and the merits were compared with the conventional case. Also, with respect to the case where the quantity of electric current was further increased, inspections were carried out by means of example. Reference will be made to the merits in the increase of the quantity of electric current.

Although the power transmission cable could have a variety of structures, it was constructed as a bi-directional power transmission cable so that a force-free state to obtain a longitudinal magnetic field effect was realized at a central portion (the inner layer portion 22). In the bi-directional power transmission cable, since a usual superconductive shield can be utilized as an electric current backward current path, it features a very simple structure, and it is possible to effectively carry out power transmission. In addition, in spite of the simple structure, since a large capacity of electric current can be transmitted at a low voltage, it is possible to obtain merits or advantages that the cable can be easily insulated.

(Determination of Magnetic Field Structure)

Figure 6:
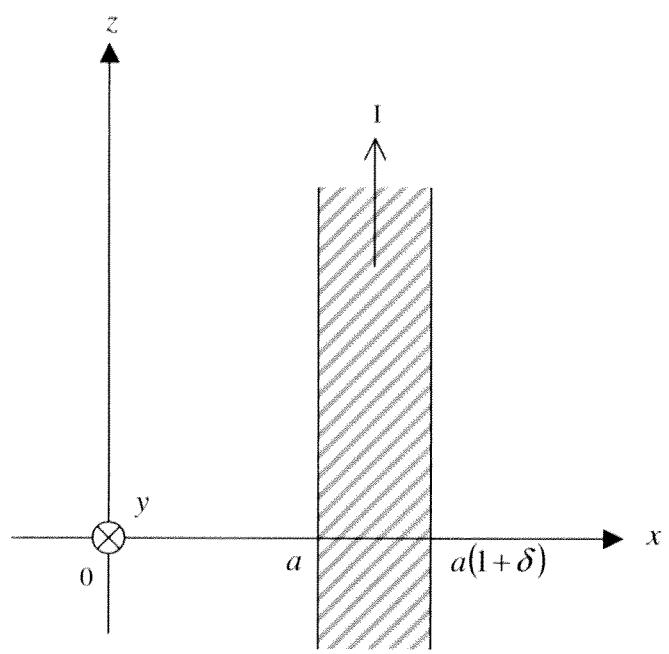
FIG. 6 is a view showing a flat plate approximation model of an inner layer portion of a superconductive cable according to EXAMPLE 1.

Representatively, a superconductive tape was approximately 0.1 mm in thickness. Thus, although some superconductive tapes were stacked up, the superconductive region was very thin in comparison with a radius which was measured from the center of the cable to the superconductive region. Accordingly, a flat plate approximation method was introduced. FIG. 6 is a view showing a flat plate approximation model of the inner layer portion of the superconductive cable according to EXAMPLE 1. As shown in FIG. 6, a central axis of the cable was defined as a z-axis, and a radius of the cable was defined as an x-axis. Each of the superconductive regions of the inner and outer layer portions was defined as a single layer: the superconductive region of the inner layer portion occupied $a \le x \le a(1+\delta)$ ($\delta \ll 1$); and the superconductive region of the outer layer portion occupied $b \le x \le b(1+\delta')$ ($\delta' \ll 1$), with each of superconductive regions extending along the y-axis.

On the assumption that an electric current I flowed into the superconductive region of the inner layer portion 22 in a positive direction of the z-axis, and that an electric current I flowed into the superconductive region of the outer layer portion 23 in a negative direction of the z-axis, a structure of the inner layer portion 22 was determined. In this case, the longitudinal magnetic field component given by the outer layer portion 23 was defined as $H_b$. Accordingly, the longitudinal component of the magnetic field, sensed by the outer surface of the inner layer portion 22 at the point of $x=a((1=\delta)$, was represented by $H_b$, and, when the total electric current flowing into the cable was defined as $I_z$, the lateral component could be represented by the following formula:

[NF (Numerical Formula) 1]

$$H_l = \frac{I_z}{2\pi a(1+\delta)} \square \frac{I_z}{2\pi a} \qquad (1)$$

Next, in the superconductive region of the inner layer portion 22 which could be assumed to be completely the longitudinal magnetic field shape, the current density J could be parallel to the magnetic flux density B, and it was assumed that a magnitude the current density could be represented by the following formula:

[NF 2]

$$J = \alpha + \beta B \qquad (2)$$

When the angle of the magnetic flux density measured from the z-axis was defined as θ, the respective y-axis and z-axis components of the magnetic flux density could be represented by B sin θ and B cos θ. Thus, when the critical state was assumed, at the total extent $a \le x \le a(1+\delta)$, the following formulas could be obtained from Maxwell's Equations:

[NF 3]

$$\mu_0 J_y = -\frac{\partial}{\partial x}(B\cos\theta) = -\frac{\partial B}{\partial x}\cos\theta + B\sin\theta\frac{\partial \theta}{\partial x} \quad (3)$$

$$\mu_0 J_z = \frac{\partial}{\partial x}(B\sin\theta) = \frac{\partial B}{\partial x}\sin\theta + B\cos\theta\frac{\partial \theta}{\partial x} \quad (4)$$

These formulas could be deformed as follows:

[NF 4]

$$\mu_0 J \sin\theta = -\frac{\partial B}{\partial x}\cos\theta + B\sin\theta\frac{\partial \theta}{\partial x} \quad (5)$$

$$\mu_0 J \cos\theta = \frac{\partial B}{\partial x}\sin\theta + B\cos\theta\frac{\partial \theta}{\partial x} \quad (6)$$

The subtraction of the formula (5) multiplied by cos θ from the formula (6) multiplied by sin θ resulted in ∂B/∂x=0, i.e., B being spatially constant. This resulted in J of the formula (2) being constant. When the formula (6) multiplied by cos θ was added to the formula (5) multiplied by sin θ, the following formula could be obtained:

[NF 5]

$$\mu_0 J - B\frac{\partial \theta}{\partial x} = 0 \quad (7)$$

Due to the fact that B and J was constant, ∂B/∂x also was constant as shown by the following formula.

[NF 6]

$$\frac{\partial \theta}{\partial x} = \frac{\mu_0 J}{B} = \text{constant} \quad (8)$$

The following formula could be obtained because of θ=0 when x=a.

[NF 7]

$$\theta = \frac{\mu_0 J}{B}(x - a) \quad (9)$$

Due to the self magnetic field $H_I$ and the longitudinal magnetic field $H_b$ produced by the superconductive region of the outer layer portion 23, the magnetic flux density B could be represented by the following formula:

[NF 8]

$$B = \mu_0(H_I^2 + H_b^2)^{\frac{1}{2}} \quad (10)$$

On the other hand, when the angle θ at x=a(1+δ) was defined as $\theta_m$, the following formula could be obtained from the formula (9):

[NF 9]

$$\theta_m = \frac{\mu_0 J a \delta}{B} \quad (11)$$

Thus, the following formula could be obtained:

[NF 10]

$$\tan\theta_m = \frac{H_I}{H_b} \quad (12)$$

By setting a value of the capacity of electric current $I_z$, a value of $H_I$ could be determined by the formula (1). Then, by setting a value of $H_b$, a value of $\theta_m$ could be determined by the formula (12). Further, it will be explained in order how other parameters are determined. First, when the superconductive material to be used was determined, the parameters α and β could be determined. Then, when a roughly estimated value of the total capacity of electric current was determined, the radius a and thickness aδ of the superconductive region of the inner layer portion 22 could be determined. Subsequently, a value of B, a value of the electric current in the critical state and so forth could be determined in succession. Next, a method of determining the value of B will be explained. When the total electric current flowing into the superconductive wire material was defined as I, I=2πa²δJ, and thus the following formula could be obtained:

[NF 11]

$$\frac{I_z}{I} = \frac{\sin\theta_m}{\theta_m} \quad (13)$$

Accordingly, when the following formula was defined:

[NF 12]

$$k = \mu_0 a \delta \frac{\sin\theta_m}{\theta_m} \quad (14)$$

The formula (10) could be deformed as follows:

[NF 13]

$$B^2 = k^2(\alpha+\beta B)^2 + (\mu_0 H_b)^2 \quad (15)$$

Thus, the following formula could be obtained:

[NF 14]

$$B = \frac{\alpha\beta k^2 + \{(k\alpha)^2 + (\mu_0 H_b)^2[1 - (k\beta)^2]\}^{\frac{1}{2}}}{1 - (k\beta)^2} \quad (16)$$

Herein, when the formula "$B=c\mu_0 H_b (c \geq 1)$" was defined, the formula (15) could be deformed as follows:

[NF 15]

$$[c^2(1-k^2\beta^2)-1](\mu_0 H_b)^2 - 2k^2\alpha\beta c\mu_0 H_b - k^2\alpha^2 = 0 \quad (17)$$

This formula could be further deformed as follows:

[NF 16]

$$\mu_0 H_b = \frac{k\alpha \left[ck\beta + (c^2-1)^{\frac{1}{2}}\right]}{c^2[1-(k\beta)^2]-1} \quad (18)$$

Also, B could be obtained from the formula "$B=c\mu_0 H_b$ ($c \geq 1$)". Thus, the following formula could be obtained from the formula (16).

[NF 17]

$$I = 2\pi a^2 \delta(\alpha + \beta B) \quad (19)$$

Accordingly, $I_z$ could be obtained from the formula (13).

(Design Instance of Inner Layer Portion)

Figure 7:
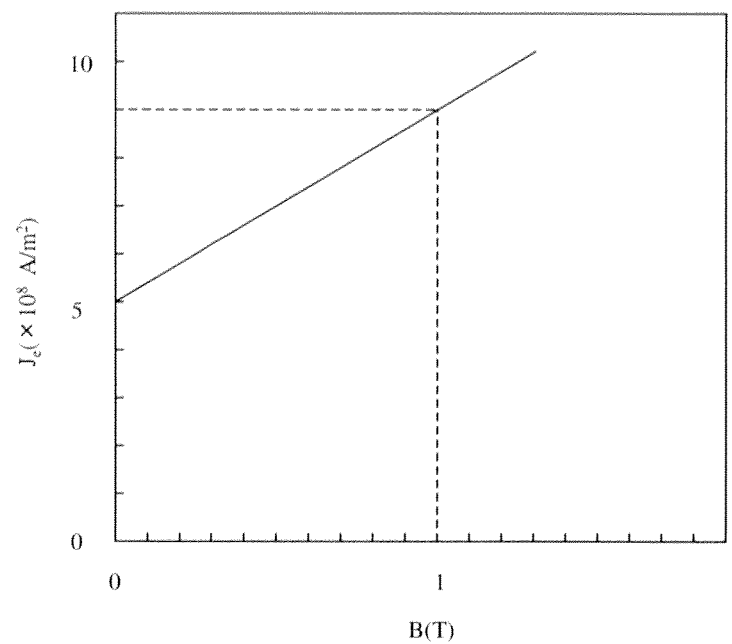
FIG. 7 is a view showing an assumption of dependence on a longitudinal magnetic field of an industrial critical current density.

Next, a design instance of the inner layer portion 22 will be explained. An operation was assumed at 77 K of liquefied nitrogen. It was assumed that the inner radius a of the superconductive region of the inner layer portion 22 had 40 mm, and that the YBCO-coated wire material having the width of 10 mm was used. In reality, although a major part of the thickness of the wire material was occupied with the base member and the stabilization metal layer, the whole region was approximately regarded as the superconductive region. It was assumed that the thickness of the wire material was 0.1 mm, and the industrial critical current density $J_e$ (which was divided by the total cross-sectional area including the other area except for the superconductive region) was substituted for J. It was assumed that the wire material had the magnetic field characteristic as shown in FIG. 7. That is, $\alpha = 5 \times 10^8$ A/m$^2$, and $\beta = 4 \times 10^8$ A/m$^2$T.

Accordingly, in the case of the zero magnetic field, when it was assumed that only one layer of the superconductive material was arranged so as to be parallel to the axial direction, the assumed capacity of electric current was determined as follows:

$$5 \times 10^8 \, [A/m^2] \times 10^{-4} \, [m] \times 2\lambda \times 4.0 \times 10^{-2} \, [m] \approx 12.6 \, kA$$

Thus, in order to carry out the power transmission at 50 kA, although it was necessary to arrange the four layers, it was assumed that the five layers were arranged because the value might somewhat decline due to the self magnetic field. In this case, the assumed capacity of electric current was 62.8 kA, which was five times as large as that value. Also, the thickness of the superconductive members in the inner layer portion was 0.5 mm. This thickness is sufficiently small in comparison with the radius of 40 mm, it can be said that there are no problem in the above-mentioned approximation.

When it was assumed that the longitudinal magnetic field produced by the superconductive material in the outer layer portion 23 is equal to the longitudinal magnetic field produced by the superconductive material in the inner layer portion 22 ($B=c\mu_0 H_b$), due to the fact that the self magnetic field was $\sqrt{3}$ times as large as $H_b$ on the outer surface of the superconductive material in the inner layer portion 22, $\theta_m = \pi/3(60°)$.

In the formula (18), if $c=2$, $\mu_0 H_b = 0.197$ [T]. Also, the total electric current I flowing into the spiral-like superconductive material and the substantial electric current $I_z$ were respective 82.7 kA and 68.4 kA. In spite of the fact that $I_z$ was in the magnetic field, and that the electric current spirally flowed, the reason why the capacity of electric current became larger than the capacity electric current of 62.8 kA, which was assumed in the case of the aforesaid five layers, was due to the longitudinal magnetic field effect. This was because the capacity was somewhat larger than that in the case of the design for 50 kA. The following Table 1 shows the values of $\mu_0 H_b$[T], I[kA] and $I_z$[kA] which were obtained when the number of layers was changed from 4 to 7.

TABLE 1

| Number of Layers | $\mu_0 H_b$[T] | I[kA] | $I_z$[kA] |
|---|---|---|---|
| 4 | 0.149 | 62.2 | 51.4 |
| 5 | 0.197 | 82.7 | 68.4 |
| 6 | 0.253 | 105.9 | 87.6 |
| 7 | 0.316 | 132.4 | 109.5 |

As shown in Table 1, the larger the number of layers, the stronger the magnetic field. That is, the merits or advantages were remarkably increased.

Figure 8:
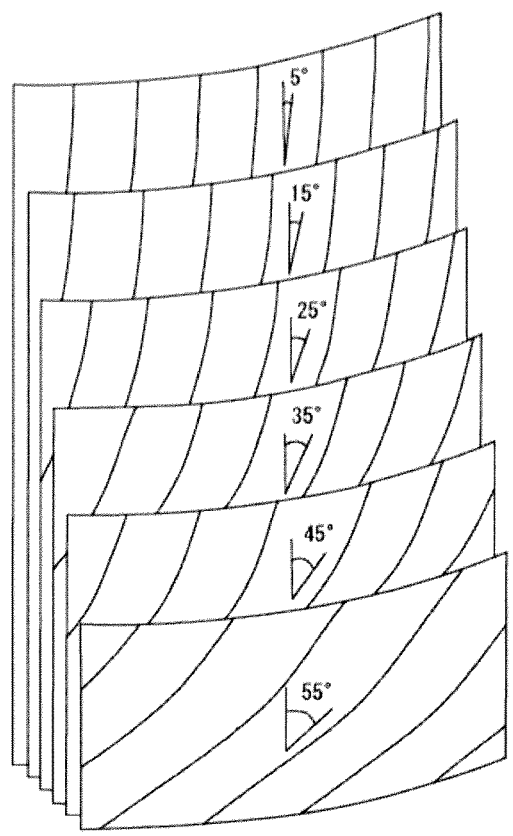
FIG. 8 is a view showing a wiring structure of the inner layer portion of the superconductive cable according to EXAMPLE 1.

In the inner layer portion 22, since it was assumed that the electric current flowed in the direction indicated by θ of the formula (9), the superconductive wire materials in the conductive portion of the inner layer portion 22 should be arranged so that the assumption could be faithfully realized. In particular, the respective angles in the superconductive layers should be increased at the rate of a given angle in accordance with the formula (9). For example, in the superconductive region of the inner layer portion 22 having the six layers, the angles in the wound wire materials should be linearly changed from 0° to $\theta_m = 60°$. FIG. 8 shows a wiring structure of the inner layer portion of the superconductive cable according to EXAMPLE 1. As shown in FIG. 8, in a real design, the respective layers could be set as 5°, 15°, 25°, 35°, 45° and 55° in order from the innermost layer.

(Design Instance of Outer Layer Portion)

With respect to a design of the outer layer portion 23, although there were some requirements, there were not usual guidelines, and thus the outer layer portion could be optionally designed. This was a merit or advantage in that flexibility on the design could be increased. One requirement was to supply the inner layer portion 22 with the longitudinal magnetic field (intensity $H_b$), and another requirement was to transmit the same quantity of electric current as in the inner layer portion 22. For the former requirement, when it was assumed that the spirally-twisted angles in the outer layer portion 23 were twisted in the reverse direction to the twisted angles in the inner layer portion 22, this caused a departure from the force-free state in which the magnetic flux and the electric current were locally parallel to each other, and which necessary for the latter requirement, and thus more superconductive tapes 6 were needed in comparison with that those of the inner layer portion 22.

In this design, although $\theta_m$ was set as a somewhat small value so that the outer layer portion 23 produced the longitudinal magnetic field having the same intensity as that produced by the inner layer portion 22, it was desirable that the radius b of the outer layer portion 23 was set not to be much different from the radius a of the inner layer portion 22 so that the length of the superconductive tapes 6 to be needed could be suppressed. Accordingly, the setting of $b=5.0 \times 10^{-2}$ [m] was given. Although an insulation problem was took into consideration due to the fact that the difference between the radiuses a and b was small, it was possible to easily resolve the insulation problem because the voltage could be lowered in that the large quantity of electric current was transmitted by the superconductive cable 1. Rather, there was a merit or advantage that the current could be easily broken in an emergency because the ratio b/a became small so that the inductance was made small.

Figure 9:
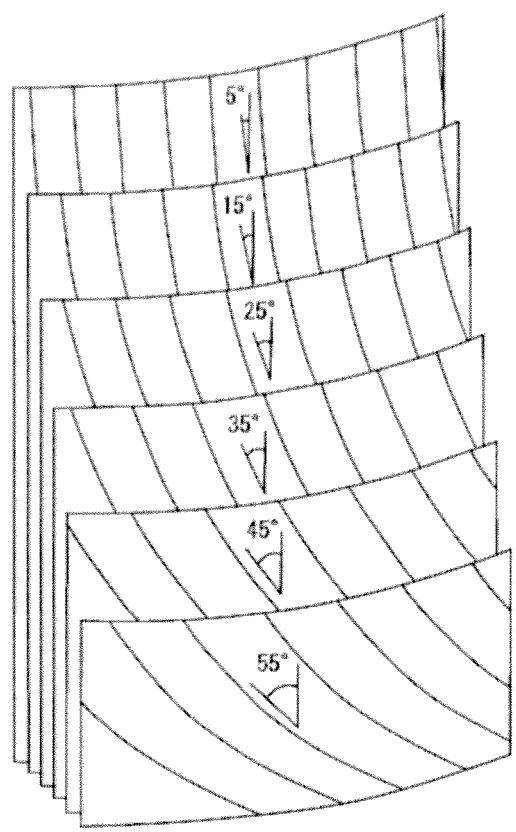
FIG. 9 is a view showing a wiring structure of an outer layer portion of then superconductive cable according to EXAMPLE 1.
Figure 10:
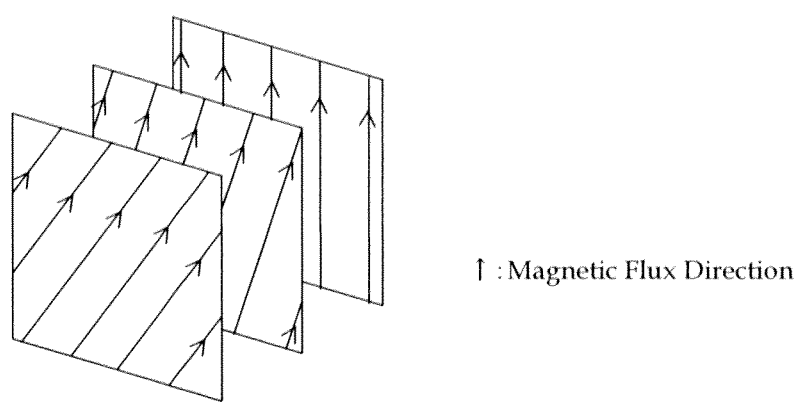
FIG. 10 is a view showing a force-free strain.
Figure 11:
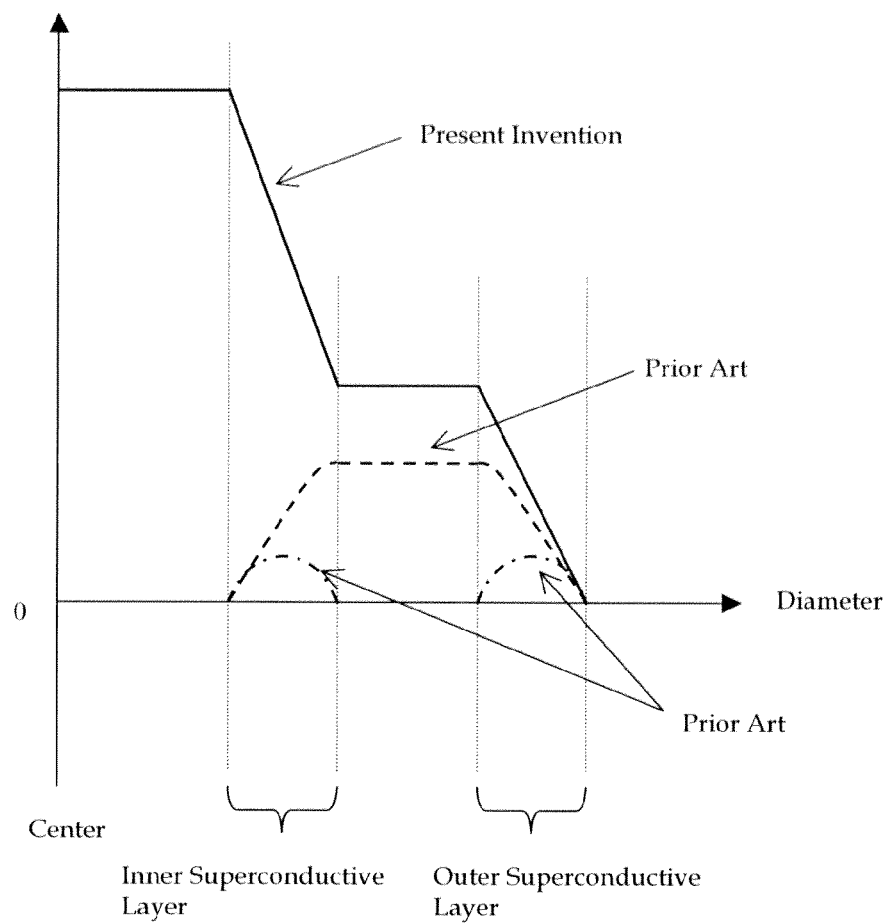
FIG. 11 is a view showing relationships between radiuses and longitudinal magnetic fields on a cable according to the present invention and prior art cables (Patent Documents 1 and 2).
Figure 12:
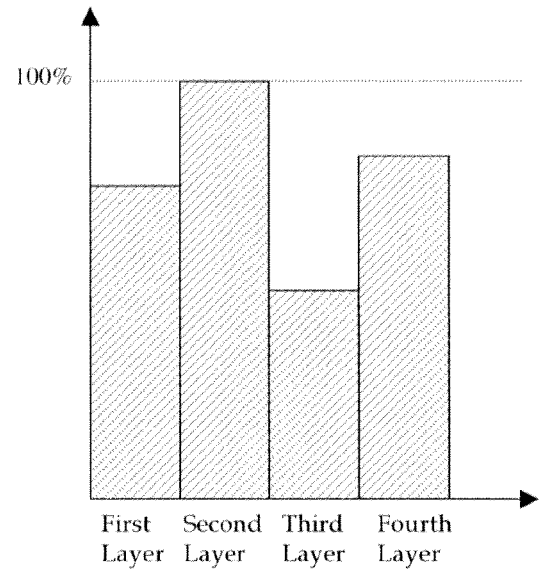
FIG. 12 is views showing some of technical contents included in the present invention and a prior art (Patent Document 3).
Figure 12:
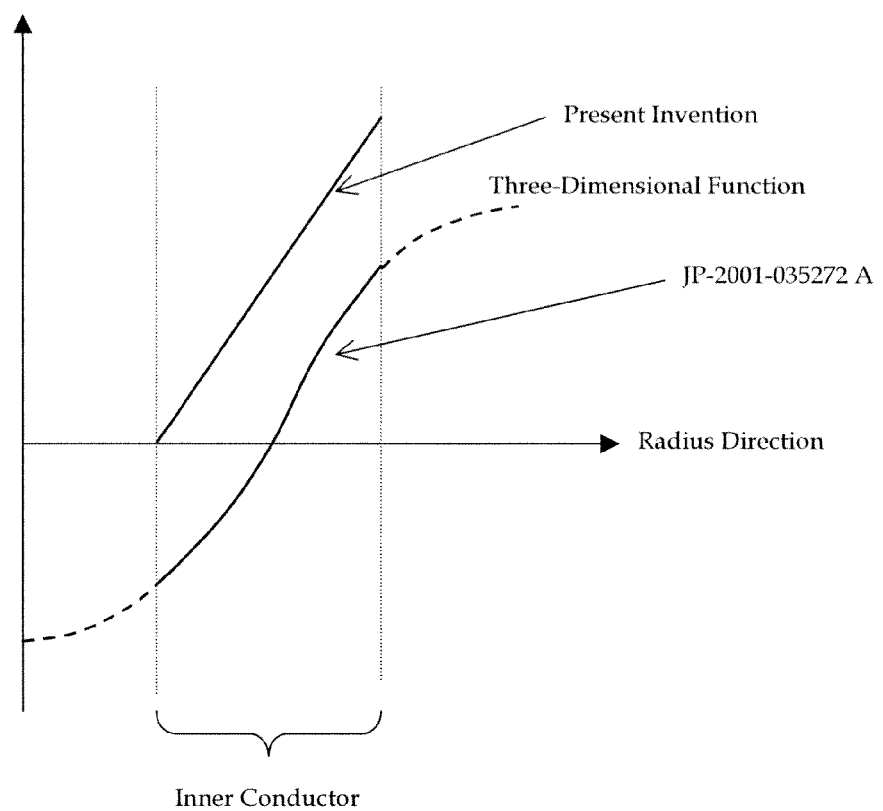

FIG. 9 is a view a wiring structure of the outer layer portion of the superconductive cable according to EXAMPLE 1. As shown in FIG. 9, the innermost layer was parallel to the standard direction, and the twisted angles were gradually increased toward the outside, with the twisted angle in the outermost layer was set to be $\theta_m$. Thus, the angle between the electric current and the magnetic field could locally become smaller than $\pi/2$, and could be substantially maintained at constant. Nevertheless, in this case, the longitudinal magnetic field produced by the outer layer portion 23 were somewhat weakened so that it was impossible to establish the complete force-free state in the inner layer portion.

Nevertheless, when the twisted angles were set in a range from an optional angle, which was not zero, to $\theta_m$ so that the complete force-free state could be established, the length of the superconductive tapes 6 to be needed had to be further lengthened, and a decrease of the Lorentz force was a little. Thus, the existence of the outer layer portion 23 was a demerit or disadvantage, and the whole merit or advantage of the superconductive cable was damaged.

Next, with relation to the foregoing, the twisted angles in the outer layer portion 23 and estimation of the Lorentz force will be explained. It was assumed that the superconductive tapes 6 were arranged in the outer layer portion 23, as shown in FIG. 9. In this case, in the innermost layer (x=b) of the outer layer portion 23, the intensity of the magnetic field produced in the direction of the y-axis by the inner layer portion 22 was $I_z/2\pi b$, and the magnetic field produced in the direction of the z-axis was $aH_b/b$ which was smaller than the original $H_b$. For this reason, the magnetic field in the innermost layer was inclined by $\theta_m$ to the standard direction, and this angle was defined as an angle between the electric current and the magnetic field in the innermost layer of the outer layer portion 23.

On the other hand, since the direction of the magnetic field in the outermost layer coincided with the standard direction, the angle between the magnetic field and the electric current also was $\theta_m$. Thus, in the outer layer portion 23, the angle between the magnetic field and the electric current could be regarded as $\theta_m$. In this instance, since $\theta_m=\pi/3$, a magnitude of the Lorentz force in the outer layer portion 23 was obtained as JB sin $\theta_m=(\sqrt{3}/2)$JB. That is, the magnitude became smaller by the multiplication of $\sqrt{3}/2$ in comparison with the case where the outer layer portion was arranged so as to be parallel to the standard direction. In other words, the capacity of electric current in the outer layer portion was increased $2/\sqrt{3}$ times. Another matter to be considered was to need the superconductive tapes 6 having a further length due to the fact that the superconductive tapes 6 were twisted and wound as shown in FIG. 9. An increased rate of the length of the superconductive tapes could be roughly estimated by the following formula:

[NF 18]

$$\frac{1}{\theta_m}\int_0^{\theta_m}\frac{1}{\cos\theta}d\theta = \frac{1}{2\theta_m}\log\frac{1+\sin\theta_m}{1-\sin\theta_m} \quad (20)$$

In this case, since $\theta_m=\pi/3$, the increased rate was 1.26. Accordingly, when the superconductive tapes 6 were arranged, as shown in FIG. 9, a rate of the superconductive tapes 6 to be needed was $1.26\times\sqrt{3}/2=1.09$, and thus an increase of about 9% was obtained. Therefore, if a length reduction effect of the superconductive tapes 6 in the inner layer portion 22 was superior to this effect, there was a merit or advantage that the force-free state was created in the outer layer portion 23. The foregoing is the explanation of the twisted angles in the outer layer portion 23 and the estimation of the Lorentz force.

As stated above, when the twisted angles the outer layer portion 23 were set in the range from 0° to $\theta_m$ the Lorentz force was somewhat decreased, whereby the increase of the length of the superconductive wire materials could be suppressed when these tapes were spirally wound. Although the length of the wire materials in the inner layer portion 22 were somewhat increased, the departure from the force-free state were very small so that there were not a serious problem. When the length of the wire materials in the outer layer portion 23 to be needed was defined as 1, the length of the wire materials in the inner layer portion 22 to be needed was defined as 0.3, and thus the increase in the length of the wire materials in the outer layer portion 23 had a serious influence in comparison with that in the length of the wire materials of the inner layer portion.

Next, with relation to the foregoing, an influence of the departure from the complete force-free state will be explained. In order to achieve the complete force-free state in the inner layer portion 22, the twisted angles of the superconductive tapes 6 in the outer layer portion 23 should become larger than the aforesaid values. In this case, although the length of the superconductive wire materials to be needed in the outer layer portion became further long, from the outset the length of the wire materials to be needed was long, thereby resulting in decline in efficiency. Instead of increasing the wire materials in the outer layer portion 23, reinforcement of the inner layer portion 22, which somewhat caused deterioration of the characteristic, should be selected because it was possible to wholly obtain large merits or advantages. The influence caused by the above-mentioned matter will be explained.

In the instance concerned, the longitudinal magnetic field on the outer surface $(x=a(1+\delta))$ of the inner layer portion 22 was $0.8 H_b$. Thus, an angle of the surface magnetic field to the standard direction could be defined by the following formula:

[NF 19]

$$\tan^{-1}\left(\frac{5\sqrt{3}}{4}\right) = 0.362 \,\pi(\,= 65.2°) \quad (21)$$

The electric current deviated from this angle by 5.2°.

In the inner surface of the inner layer portion (x=a), an angle of the electric current coincided with that angle, and thus an average deviation angle was 2.6°. In short, the created Lorentz force was represented by sin 2.6°=0.045 in comparison with the case where the electric current and the magnetic flux were parallel to each other, and the capacity of electric current was simply increased about 22 times. However, in reality, the critical current density was saturated at the value obtained under the longitudinal magnetic field, without being increased by the decrease in the Lorentz force. In the case of present wire materials, due to the fact that the capacity of electric current was increased 4-5 times in the magnetic field of about 0.5 T, it was considered that the critical current density could be hardly deteriorated in the case of the small deviation angle as stated above. In other words, although the longitudinal magnetic field produced by the outer layer portion 23 was somewhat weakened, it could be said that sufficient merits or advantages could be obtained. The foregoing is the explanation of the influence of the departure from the complete force-free state.

Next, the superconductive cables having the same capacities of electric current as in the case of Table 1 were designed by arranging the same superconductive tapes 6 in parallel to the standard direction, and it was tentatively estimated what superconductive tapes were needed, provided that the radiuses of the inner and outer superconductive layers were the same as stated above (a=4 cm and b=5 cm). An magnitude of the self magnetic field is determined by the capacity of electric current, and it was predicted that a decline of the critical current density would occur at a half of the maximum empirical self magnetic field, an amount of superconductive tape 6 was determined to a given capacity of electric current.

Some supplementary explanation is made on the predication of the decline of the critical density at the half of the maximum empirical self magnetic field. With respect to a characteristic in a lateral magnetic field of a critical current density of a real Gd-123 coated wire material, when an external lateral magnetic field was defined as BT, a magnetic field dependence on the critical current density could be represented by the following formula:

[NF 20]

$$J_c = 2.96 - 9.575B + 12.125B^2 [\times 10^{10} \text{ A/m}^2] \quad (22)$$

When this was divided by the total cross-sectional area including the base member, an industrial critical current density could be obtained. Nevertheless, in this case, the following standardized current density was used instead:

[NF 21]

$$j_c = \frac{J_c(B)}{J_c(0)} \quad (23)$$

When the amount of superconductive tape 6 to be needed, which was obtained by the aforesaid procedure, was defined as 1, each of the amounts of superconductive tapes 6 was determined, and was regarded as an economical factor. The results so obtained are shown in the following Table 2.

TABLE 2

| Number of Layers | Current Capacity $(I_c)$[kA] | $\mu_0 H_I/2$[T] | Needed Amount of Wire Material |
|---|---|---|---|
| 4 | 51.4 | 0.129 | 0.872 |
| 5 | 68.4 | 0.171 | 0.829 |
| 6 | 87.6 | 0.219 | 0.790 |
| 7 | 109.5 | 0.274 | 0.756 |

According to Table 2, it is founded that an economical merit or advantage can be more increased by establishing the state approaching to the force-free state as the capacity of electric current becomes larger. In the case where the capacity of electric current is small, taking into consideration the case where no longitudinal magnetic field is produced by the outer layer portion, it is possible to obtain the economical merit or advantage by weakening the longitudinal magnetic field produced by the outer layer portion 23.

EXAMPLE 2

Next, with respect to the superconductive cable 1 as shown in FIG. 4, the case where the longitudinal magnetic field is not produced by the outer layer portion (i.e., the case where the average twisted angle is 0°) will be explained, referring to merits or advantages of the superconductive cable 1 itself. This corresponded to the case where the superconductive tapes used in the outer layer portion were arranged in the standard direction side by side, and where an amount of the superconductive tapes to be used was minimized. In this case, it was possible to obtain the merits or advantages equivalent to those obtained by the model investigated in EXAMPLE 1. In particular, although the complete force-free state could not be achieved, the Lorentz force could be considerably reduced by establishing the state approaching to the force-free state, so that it was possible to increase an amount of transmittable electric power. This technique could be applied to both a direct current power transmission cable and an alternating current power transmission cable. Note, although it is possible to further improve an electric power transmission performance by configuring the outer layer portion so that the longitudinal magnetic field is produced as much as possible, it is necessary to optimize it, taking into consideration an amount of superconductive tape to be used.

If the magnetic field was shifted from a state in which it was perpendicular to the electric current toward a state in which it was parallel to the electric current, and if the angle between the magnetic field and the electric current was defined as $\phi$, the critical current density was gradually increased in inverse proportion to $\sin \phi$. Nevertheless, the critical current density was saturated under the finite longitudinal magnetic field without the critical current density diverging at $\phi=0$ in which the magnetic field and the electric current were parallel to each other. At the present situation in which researches regarding this phenomenon have not been carried out in detail, although an exact investigation could not be carried out, it was possible to roughly estimate the critical current density in dependence with the fact to what degree the Lorentz force was decreased when $\phi$ was not too small. Next, reference will be made to an analysis of the Lorentz force under conditions that the longitudinal magnetic field was not produced in the case of FIG. 8.

Similar to the formula (9), when an twisted angle in the superconductive layer was defined by the following formula:

[NF 22]

$$\theta(x) = \alpha(x-a) \quad (24)$$

Thus, the following Maxwell's equations corresponding to the formulas (3) and (4) were obtained:

[NF 23]

$$\mu_0 J \sin\theta = -\frac{\partial B_z}{\partial x} \quad (25)$$

$$\mu_0 J \cos\theta = \frac{\partial B_y}{\partial x} \quad (26)$$

In these formulas, the respective $B_y$ and $B_z$ represented the magnetic flux components in the y and z axes, and the formulas (25) and (26) corresponded to the respective densities of the currents flowing in the directions of the y and z axes. In this case, since the electric currents were given by the twisted wire materials, it was necessary to find the magnetic flux components $B_y$ and $B_z$. Then, by solving the formulas (25) and (26), the following formula could be obtained under the conditions that $B_z=0$ when $x=(1+\delta)$:

[NF 24]

$$B_z = -\frac{\mu_0 J}{\alpha}(\cos\theta_0 - \cos\alpha x') \quad (27)$$

Provided that $\theta_0 = \alpha a \delta$ and $x' = x-a$.

Then, the following formula could be obtained under the conditions that $B_y=0$ when $x=a$ ($x'=0$):

[NF 25]

$$B_y = \frac{\mu_0 J}{\alpha}(\sin\alpha x') \tag{28}$$

Accordingly, the Lorentz force could be defined by the following formula:

[NF 26]

$$F_{L1} = J \times B = (J_y B_z - J_z B_y)i_x = -\frac{\mu_0 J^2}{\alpha}\cos\theta_0 \sin\alpha x' i_x \tag{29}$$

Herein: $i_x$ was a unit vector in the direction of the x-axis.

On the other hand, the case where the superconductive tapes 6 were arranged so as to be parallel to each other without being twisted was investigated as a comparative object. In this case, since it was assumed that the electric current flowed in only the direction of the z-axis, the magnetic flux density was composed of only the y-axis component, and thus was defined by the following formula:

[NF 27]

$$\mu_0 J = \frac{\partial B}{\partial x} \tag{30}$$

Thus, the following formula could be obtained:

[NF 28]

$$B = \mu_0 J x' \tag{31}$$

Accordingly, the Lorentz force concerned could be determined by the following formula:

[NF 29]

$$F_{L2} = -\mu_0 J^2 x' i_x = -\frac{\mu_0 J^2}{\alpha}\theta i_x \tag{32}$$

Thus, a ratio of a magnitude of the Lorentz force could be defined by the following formula:

[NF 30]

$$\frac{|F_{L1}|}{|F_{L2}|} = G = \cos\theta_0 \frac{\sin\theta}{\theta} \tag{33}$$

This average value could be obtained by the following formula:

[NF 31]

$$\langle G \rangle = \frac{\cos\theta_0}{\theta_0}\int_0^{\theta_0}\frac{\sin\theta}{\theta}d\theta \tag{34}$$

In this case, the value could be estimated by using the following formula

[NF 32]

$$\int_0^{\theta_0}\frac{\sin\theta}{\theta}d\theta = \theta_0 - \frac{\theta_0^3}{3\cdot 3!} + \frac{\theta_0^5}{5\cdot 5!} + \frac{\theta_0^7}{7\cdot 7!}\cdots \tag{35}$$

When $\theta_0=\theta_m=\pi/3$, $\langle G \rangle = 0.470$ Thus, by configuring superconductive tapes so that the state approaching to the force-free state could be established, the Lorentz force could be considerably decreased. Accordingly, a pinning effect could relatively be increased whereby much the electric current could flow into the superconductive tapes.

From the aforesaid results, it is apparent that the Lorentz force can be decreased to 47.0% in comparison with the case where the superconductive tapes 6 are arranged so as to be parallel to the standard direction. Also, as shown by the formula (20) when it is took into consideration that an amount of the wire materials to be used for the superconductive tapes 6 is increased, a whole economical efficiency is 0.470×1.26=0.592. In even the bad case where 40% of the wire materials is cut out (i.e., the case where the minimum amount of the superconductive wire material is used in the outer layer portion without producing the longitudinal magnetic field), if the spiral structure is introduced into only the inner layer portion, the present invention have merits or advantages which are never obtained from the conventional ones.

Note, since the above-mentioned Examples are shown as the results of the simulation, there may be a case where the same configurations, numerical results and so forth cannot be necessarily obtained when the present invention is practically embodied.

The invention claimed is:

1. A superconductive cable that transmits an electric power by using superconductive material, comprising
a conductive portion that is constructed by superconductive members spirally arranged at either a positive angle or a negative angle with respect to a standard direction defined as a longitudinal direction of the superconductive cable
characterized by the fact that said conductive portion comprises a plurality of layers, that the spiral angles of the respective layers gradually becomes larger in relation to said standard direction in order from an innermost layer toward an outermost layer, and that magnetic fields are produced by electric currents flowing into said conductive portion in the same direction as a direction in which the electric currents flow.

2. The superconductive cable as set forth in claim 1, characterized by the fact that said spiral angles in the respective layers gradually becomes larger from each other to said standard direction in order from the innermost layer toward the outermost layer within an range from 0° to 60°.

3. The superconductive cable as set forth in claim 1, characterized by the fact that the innermost layer of said conductive portion is arranged so as to be parallel to said standard direction.

4. The superconductive cable as set forth in claim 1, characterized by the fact that each of the angles, at which said conductive portion is constructed, is regulated as an angle at which that each of the electric currents flowing through the conductive portion and a corresponding magnetic flux density are the same as each other.

5. The superconductive cable as set forth in claim 1, characterized by the fact that said superconductive members are composed of a plurality of superconductive tapes, that said conductive portion is constructed from the superconductive tapes which are juxtaposed with each other, and that each of said superconductive tapes includes a stabilization layer which serves as a bypass for the electric current flowing into the corresponding superconductive tape.

6. The superconductive cable as set forth in claim 1, characterized by the fact that said superconductive cable includes:

an inner layer portion that is defined by the layers in said conductive portion;

an outer layer portion which is defined as a conductive portion composed of superconductive members, with the superconductive members of the outer layer portion being spirally arranged with respect to the standard direction in the reverse spiral direction to the spiral direction in which the superconductive members of the inner layer portion are spirally arranged; and an insulating layer provided between the inner layer portion and the outer layer portion.

7. The superconductive cable as set forth in claim 6, characterized by the fact that said outer layer portion is composed of a plurality of layers, and that the spiral angles in the respective layers are different from each other to said standard direction in order from an innermost layer toward an outermost layer.

8. The superconductive cable as set forth in claim 7, characterized by the fact that the innermost layer of said outer layer portion defined as the conductive portion are arranged so as to be parallel to said standard direction.

9. The superconductive cable as set forth in claim 6, characterized by the fact that a direction in which an electric current flows into said inner layer portion and a direction in which an electric current flows into said outer layer portion are reverse to each other with respect to said standard direction.

10. An alternating current power transmission cable comprising three superconductive cables, each of which is set forth in claim 1, characterized by the fact that said three superconductive cable are bundled in a three-phase manner.

11. The superconductive cable as set forth in claim 1, characterized by the fact that each of said superconductive members at least includes a tape-like superconductive layer into which an electrical current flows in a superconductive state, that said superconductive members are juxtaposed with each other to thereby define said conductive portion, and that said tape-like superconductive layer has a thickness falling within a range from 0.1 μm to 0.4 μm.

* * * * *